United States Patent [19]
Barrett

[11] Patent Number: 5,640,375
[45] Date of Patent: Jun. 17, 1997

[54] METHOD AND APPARATUS FOR CONTROLLING A MULTI-DISC PHOTO CD PLAYER

[75] Inventor: Henry Anthony Barrett, Rochester, N.Y.

[73] Assignee: Eastman Kodak Company, Rochester, N.Y.

[21] Appl. No.: 632,567

[22] Filed: Apr. 15, 1996

Related U.S. Application Data

[60] Provisional application No. 60/000,908, Jun. 27, 1995.
[51] Int. Cl.⁶ .......................... G11B 17/22; G11B 13/00
[52] U.S. Cl. .................................... 369/30; 369/14
[58] Field of Search ............................. 369/30, 14, 34, 369/36, 33, 35, 37, 38, 52, 47; 358/335

[56] References Cited

U.S. PATENT DOCUMENTS

| | | | |
|---|---|---|---|
| 4,717,971 | 1/1988 | Sawyer | 358/342 |
| 5,168,481 | 12/1992 | Culbertson et al. | 369/2 |
| 5,189,656 | 2/1993 | Masaki et al. | 369/47 |
| 5,282,187 | 1/1994 | Lee | 369/52 |
| 5,331,614 | 7/1994 | Ogawa et al. | 369/34 |
| 5,461,596 | 10/1995 | Barrett | 369/14 |
| 5,532,836 | 7/1996 | Luyckx et al. | 358/335 |

*Primary Examiner*—Tan Dinh
*Attorney, Agent, or Firm*—Robert V. Wilder

[57] ABSTRACT

A CD player, including an improved controller circuit, is capable of displaying a plurality of photo quality images together with audio snippets which correspond to the individual visual presentations on a series of sequential CDs. The controller circuit includes a detector circuit for detecting the presence and absense of an audio signal, providing an audio signal to the controller for appropriate processing. Timing signal generators operate to sequence CHANGE DISC, PLAY and STOP functions to achieve automatic and continuous photo CD presentations for a plulality of Photo CDs being played.

6 Claims, 5 Drawing Sheets

METHOD AND APPARATUS FOR CONTROLLING A MULTI-DISC PHOTO CD PLAYER

CROSS REFERENCE TO RELATED APPLICATION

Reference is made to and priority claimed from U.S. Provisional application Ser. No. 60/000,908, filed 27 Jun. 1995, entitled CD MULTIDISC CONTROLLER METHOD AND APPARATUS.

FIELD OF THE INVENTION

The present invention relates generally to Photo CD players and more particularly to an improved multidisc Photo CD player controller method and apparatus.

BACKGROUND OF THE INVENTION

With the growth and popularity of photographic Compact Disc Players and Photo CDs, there has been created a need for the storage and playing of longer lasting automatic programs whereby a plurality of CDs are automatically played as one continuous program. Such requirements have arisen in both the commercial and non-commercial applications where detailed presentations are made for product sales, group instruction and training, and many other applications where there is a need for the efficient communication of detailed information including graphic information about any particular subject.

Recently, multi-disc portfolio Photo CD players have been introduced which allow CD presentations with audio segments or snippets included. The audio segments are included on the Photo CD such that when a photo or image is presented on a display, an appropriate audio section is also played to explain what is being presented and viewed by an audience, and also any other relevant information that is desired to be communicated concerning the image which is being displayed. Currently, however, sequential multi-disc programs, using Photo CDs with audio snippets cannot be presented in sequence without user interaction. This limitation results in the inability to use Photo CDs with audio snippets for applications requiring more than one CD at a time. For longer and more detailed presentations, there is a need to provide a CD player with a controller arrangement that eliminates the need for operator interaction when presenting a plurality of Photo CDs with audio snippets.

SUMMARY OF THE INVENTION

It is therefore an object of the present invention to provide an improved Photo CD player system in which a compact disc (CD) player is arranged to receive a plurality of CDs, with each of the CDs including both video and audio data. The CD player further includes means for reading the CD and providing output signals representative of the video and audio data stored on the CD. The Photo CD player further comprises an audio data detecting device connected to the reading means and operable to provide an audio data signal representative of the presence of audio data on a photo segment of the CD being played; a controller circuit means responsive to the audio data detecting means to generate a disc change signal after a first predetermined period following the detection of a predetermined characteristic of said audio data signal, the disc change signal being selectively applicable to effect a first changing of CDs by the CD player to the next CD of a plurality of CDs; the controller circuit being further responsive to said audio data signal to generate a first play signal after a second predetermined period following the detection of said predetermined characteristic of said audio data signal, the first play signal being selectively applicable to effect a playing of the next CD; the controller circuit being further responsive to the audio data signal to generate a first stop signal after a third predetermined period following the detection of said predetermined characteristic of said audio data signal, the first stop signal being selectively applicable to effect a termination of play of the next CD.

In a further embodiment, the controller circuit further includes a restart circuit responsive to the stop signal and the audio data signal, with the restart circuit being responsive to an occurrence of a predetermined relationship between the audio data signal and the first stop signal to generate a second play signal, where the second play signal is selectively applicable within the CD player to effect a playing of the next CD by the CD player.

A method in accordance with the present invention includes controlling the sequential playing of a plurality of Photo CDs on a Photo CD player, where the CDs contain both video and audio data, and the method comprising the steps of detecting the absence of audio data; generating a change signal effective to change discs to the next of the plurality of discs whenever said absence exceeds a first predetermined period; generating a play signal effective to initiate a play sequence to play the next disc after a second predetermined period following the generation of the change signal; and generating a first stop signal effective to stop the play of the next disc whenever the absence exceeds a third predetermined period.

In another embodiment, the method further includes the steps of: generating a second play signal effective to initiate a play sequence after a predetermined period following the generation of the first stop signal; and generating a second stop signal effective to stop the play of the CD player after a predetermined period following the generation of the second play signal.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
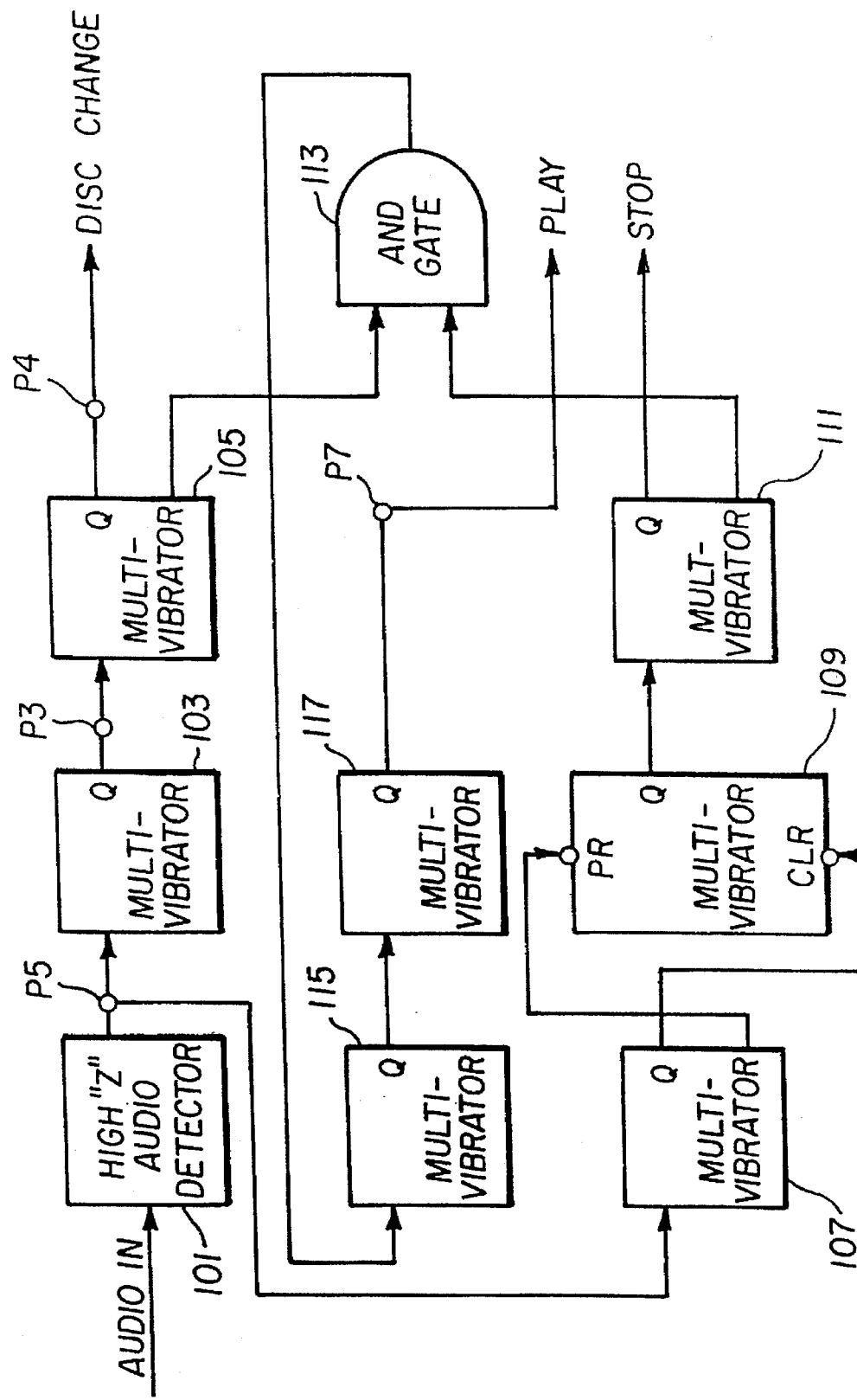
FIG. 1 is a schematic diagram of one exemplary embodiment of a Photo CD device according to the present invention.

Referring now to FIG. 1 in detail, a high impedance or "High Z" audio detector circuit 101 is arranged to receive an audio input signal from a compact disc (CD) player. The audio input signal is the audio track of a portfolio Photo CD in the present example. The output of the audio detector 101 is applied to a "one-shot" multivibrator circuit 103 and also taken from point P5 and applied to another multivibrator 107. The output of the circuit 103 is applied through reference point P3 to another one-shot device 105 which in turn provides an output "DISC CHANGE" signal through circuit reference point P4. The circuit 105 also provides an output which is applied to an AND gate 113. AND gate 113 applies an output signal to a pulse generator or "one-shot" multivibrator circuit 115, which, in turn applies an output thereof to another pulse generator circuit 117. A "PLAY" output signal is taken from the output of the circuit 117 through circuit reference point P7.

The pulse generator circuit 107 generates two output signals which are applied to the "PR" and "CLR" terminals of circuit 109, which in turn provides an output signal which is applied to a pulse generator circuit 111. The "Q" output of circuit 107 is applied at the circuit reference point P8. The circuit 111 has one output connected to the input of the AND gate 113 and the other output terminal provides the "STOP" output signal.

Figure 2:
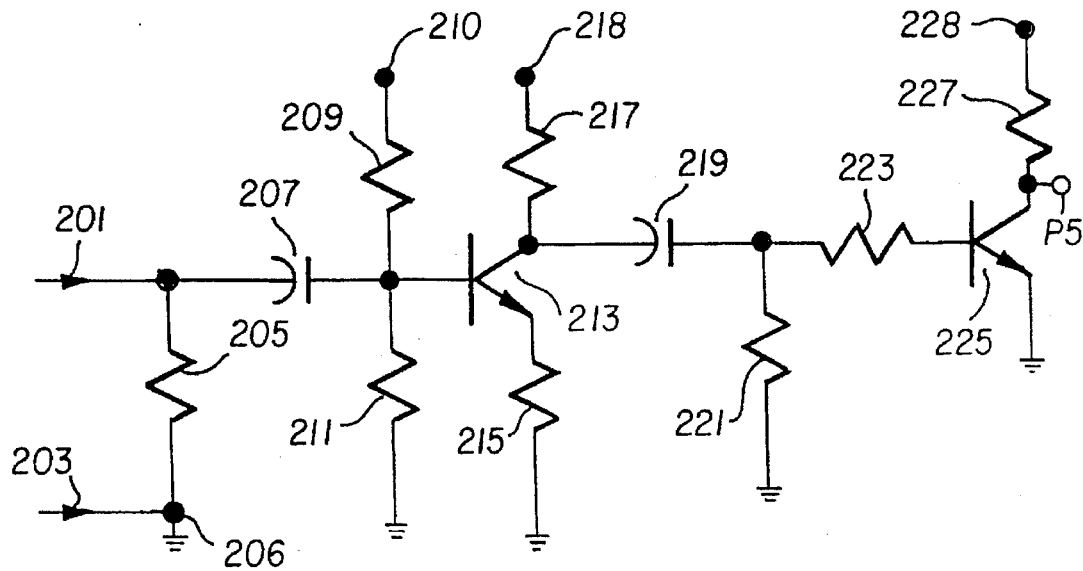
FIG. 2 is a circuit diagram of the Audio Detector shown in FIG. 1.

As shown in FIG. 2, the audio detector circuit has an audio signal applied on lines 201 and 203 across resistor 205. Line 201 is connected to one end of a capacitor 207, the other end of which is applied to a midpoint between resistors 209 and 211. Resistors 209 and 211 are connected in series between a reference voltage at terminal 210 and a common point 206. The midpoint between the resistors 209 and 211 is connected to the base terminal of a transistor 213, the collector terminal of which is connected through a resistor 217 to a reference potential at point 218. The emitter terminal of the transistor 213 is connected through a resistor 215 to the common point. The collector terminal of the resistor 213 is also connected through a capacitor 219 and a series connected resistor 223 to the base terminal of another transistor 225. The point between the capacitor 219 and the resistor 223 is connected through another resistor 221 to the circuit common point. The emitter terminal of the transistor 225 is also connected to the circuit common while the collector terminal of the transistor 225 is connected through a resistor 227 to a reference potential point 228. The output from the audio detector shown in FIG. 2 is taken from the collector of the transistor 225 at reference point P5 and applied to the pulse generator devices 103 and 107 as shown in FIG. 1.

In general, the audio detector 101 provides an output signal at point P5 upon the detection of analog audio signals being generated by a Photo CD player. With power applied and without audio signals being generated, the output of the audio detector 101 is at a high logic level. At that time, the output of multivibrator circuits 103 and 107 are at a low logic level and in an untriggered state. So long as audio signals are being detected, the output of circuits 103 and 107 are both at a high logic level. When the audio segment from a segment or selection being played on the Photo CD player stops, the output of multivibrator 103 will stay at a high logic level for approximately 15 seconds. That period of time may be adjusted to suit particular applications. Also the output of multivibrator circuit 107 will remain at a high logic level for approximately 40 seconds. Since it takes approximately 3.5 seconds to refresh the television displaying the output of the Photo CD player, with a new picture segment, and since a new audio segment will begin immediately when the new picture segment is read, the outputs of both multivibrator circuits 103 and 107 will remain at a high logic level through normal operation of the Photo CD player while sequential audio and video segments are presented on a system monitor.

At the end of a disc-playing sequence of photo displays and associated audio snippets from a portfolio Photo CD, the audio present signal at point P5 goes to a low logic level and remains at that level until subsequent audio signals are detected as being present. The 15 second positive pulse from the multivibrator circuit 103 will time-out and the output signal from the multivibrator 103 will go to a low logic level. That signal change will trigger multivibrator circuit 105 which will then generate a 0.2 second positive going pulse at the output P4 of circuit 105. That output signal, shown as the DISC CHANGE signal from the output of circuit 105 in FIG. 1, is representative that it is time to change discs in the Photo CD player and may be applied within the player control circuitry to effect such an action.

In addition, when the 0.2 second output pulse DISC CHANGE signal is produced at one output of the multivibrator 105, another output line applies a high-to-low going 0.2 second pulse at one input of the AND gate 113. That signal is effective to trigger multivibrator circuit 115 to provide an output 2 to 3 second positive going pulse to the input of multivibrator circuit 117. When the 2 second output signal from the multivibrator 115 again goes to the low logic level, multivibrator 117 is triggered and generates a 1 second positive going pulse at its output at point P7. That signal is representative that a PLAY sequence may be initiated and the PLAY signal may be applied to the Photo CD player to effect a "Play" operation to begin the playing of another Photo CD. Accordingly, at the end of a Photo CD disc playing sequence, a CHANGE DISC signal is generated to effect the changing of discs followed by the generation of a PLAY signal which is applied to initiate the playing sequence of the new disc.

To insure that a play sequence begins with a new disc, the output of multivibrator circuit 107 remains at a high logic level for periods of approximately 50 seconds after each trigger from the audio detector 101. If there is no audio for a period of longer than 50 seconds, the output of multivibrator 107 will go to a low logic level, which, in turn, will cause the output of the circuit 109 to go to a low logic level. When the output of the circuit 109 goes to a low logic level, multivibrator or pulse generator circuit 111 will provide an 0.8 second positive going output signal STOP which may be applied to the Photo CD player to cause the player to initiate the STOP mode.

In connection with the generation of the STOP signal, a second output from the circuit 111 provides a high to low-going pulse which is applied to a second input to the AND gate 113. That signal is effective to again initiate the PLAY signal generating sequence as hereinbefore discussed in connection with multivibrator circuits 115 and 117. When the PLAY signal is subsequently generated, the Photo CD player is operable to begin playing the new CD and provide continuous CD play for multiple CDs. Accordingly, with the embodiment disclosed in FIG. 1, a PLAY signal is generated after the generation of a STOP signal, to enable the continuous playing of a plurality of Photo CDs without the need for a user to manually interact with the system to change Photo CDs. Under certain conditions, the generation of more than one PLAY signal following a STOP command is desirable to enable and insure fail-safe continuous operation of the CD player for a plurality of CDs. That added feature may be accomplished through the use of the embodiment shown in FIG. 3.

Figure 3:
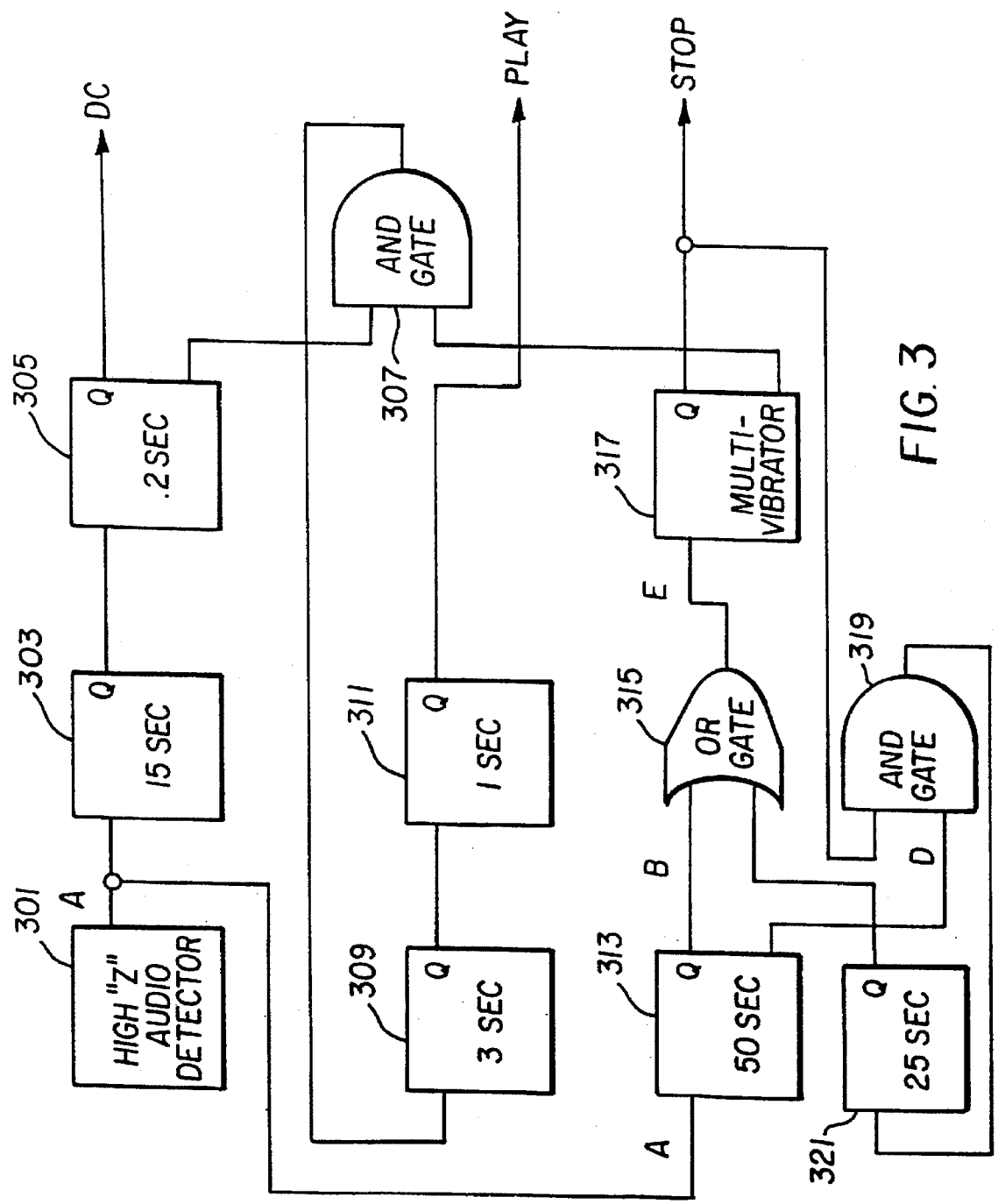
FIG. 3 is a block diagram of another embodiment of the present invention.

In FIG. 3, an audio detector 301 which applies output signals to pulse generators 303 and 313. The output from the circuit 303 is applied to a one-shot pulse generator circuit 305. Circuit 305 provides a "CHANGE DISC" or "DC"

output signal and also provides an input to AND gate 307. The output of the AND gate 307 is applied to pulse generator 309 which in turn applies an output thereof to another pulse generator 311. The pulse generator circuit 311 provides an output "PLAY" signal. The output signal "A" from the audio detector circuit 301 is applied to pulse generator 313 which in turn provides output signals "B" and "D". The signal "B" is applied to one input of an "OR" gate 315, which provides an output signal "E". The signal "E" is applied to the input of pulse generator 317 which, in turn, provides a "STOP" output signal, which is also applied to one input of AND gate 319. A second output signal from the One-shot circuit 317 is applied to one input of another AND gate 307. And gate 319 also receives an input signal "D" from the pulse generator 313, and generates an output signal which is applied to the input of another pulse generator 321. Pulse generator circuit 321 provides an input signal to a second input of the OR gate 315.

Figure 4:
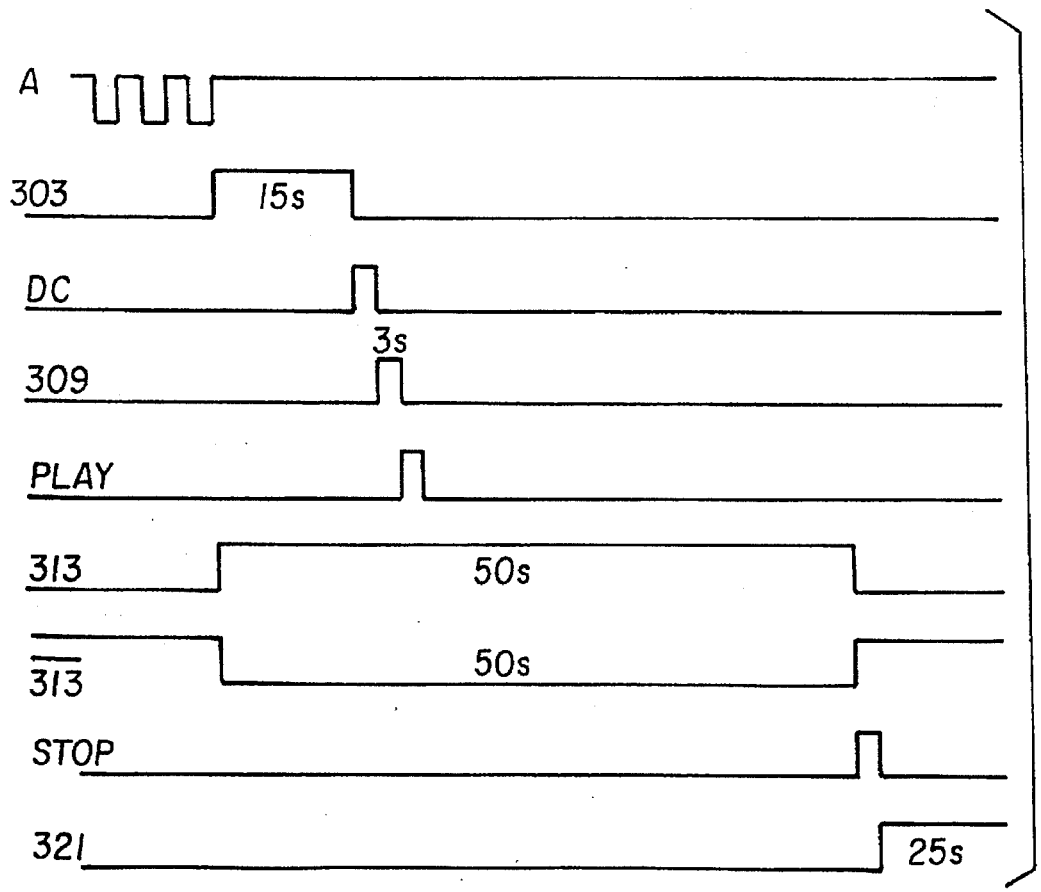
FIG. 4 is a timing chart showing the relative timing among various signals within the present invention as shown in FIG. 3.

FIG. 4 shows the various timing signals which are generated and applied as shown in FIG. 3. As shown, signal "A" indicates the presence or absense of detected audio signals from the portfolio Photo CD. The timing signals are either at a "high" logic level or a "low" logic level, as shown, depending upon the audio input and the operation of the pulse generator circuits as will be described in more detail in connection with the operational flow charts of FIG. 5 and FIG. 6.

Figure 5:
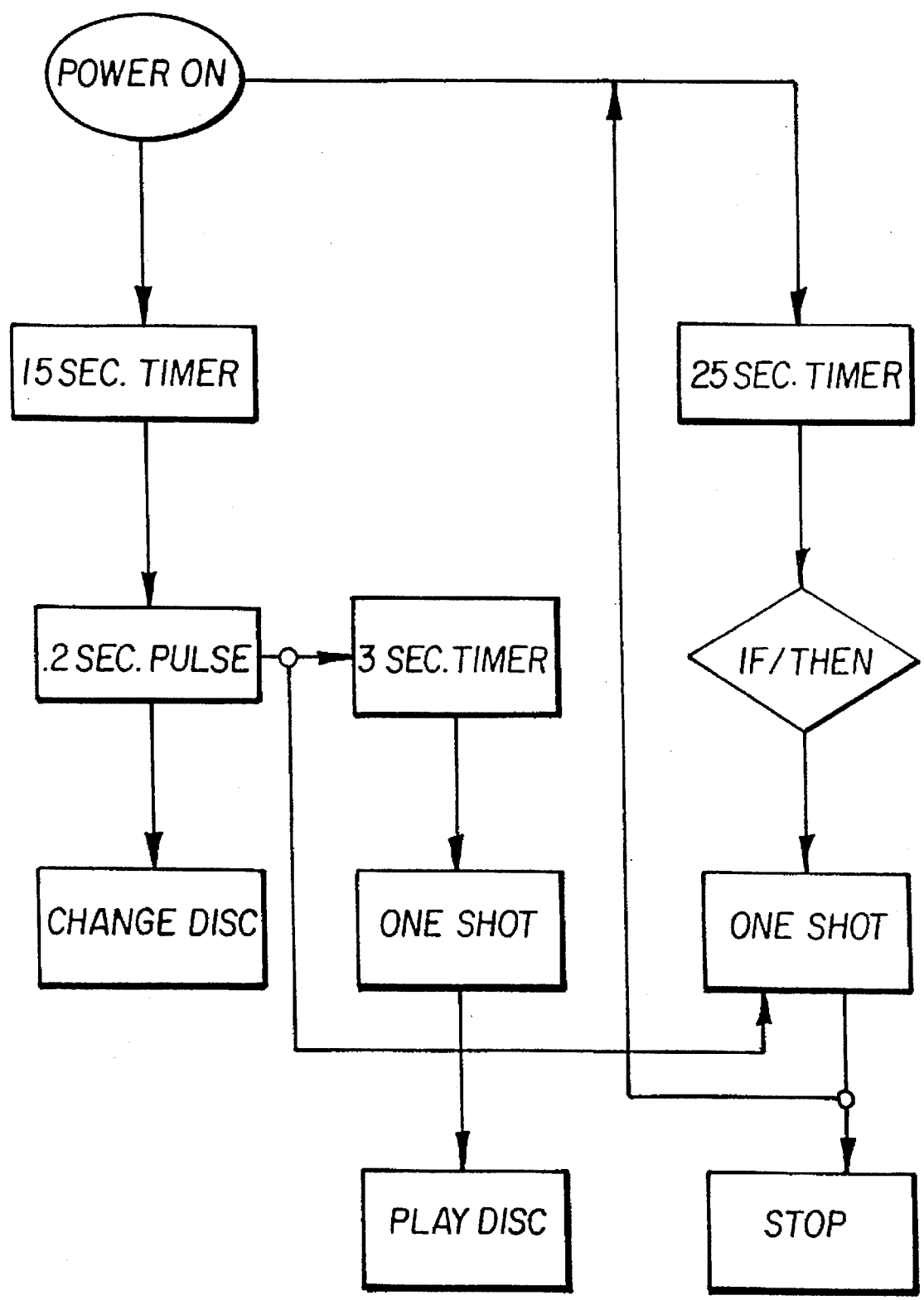
FIG. 5 is a flow diagram illustrating one operational cycle of one embodiment of the present invention.

FIG. 5 illustrates an operational flow of a "power-on" cycle for the controller circuitry shown in FIG. 3. The multi-disc controller circuit shown in FIG. 1 insures that at the end of the last audio program segment on each portfolio Photo CD, a "CHANGE DISC" command with a "PLAY" sequence is initiated. This is accomplished by sampling the audio and using a series of timer circuits with corresponding logic circuitry. Also, in the event that the multi-disc player fails to begin the next sequential portfolio Photo CD, a "STOP" signal is generated followed by a single "PLAY" sequence. The embodiment of FIG. 3 provides for the generation of either continuous or a series of "PLAY" signals to insure that the PLAY sequence is initiated. In the FIG. 3 embodiment, the PLAY sequence is initiated and continued until the controller circuit detects audio content from the new disc.

Figure 6:
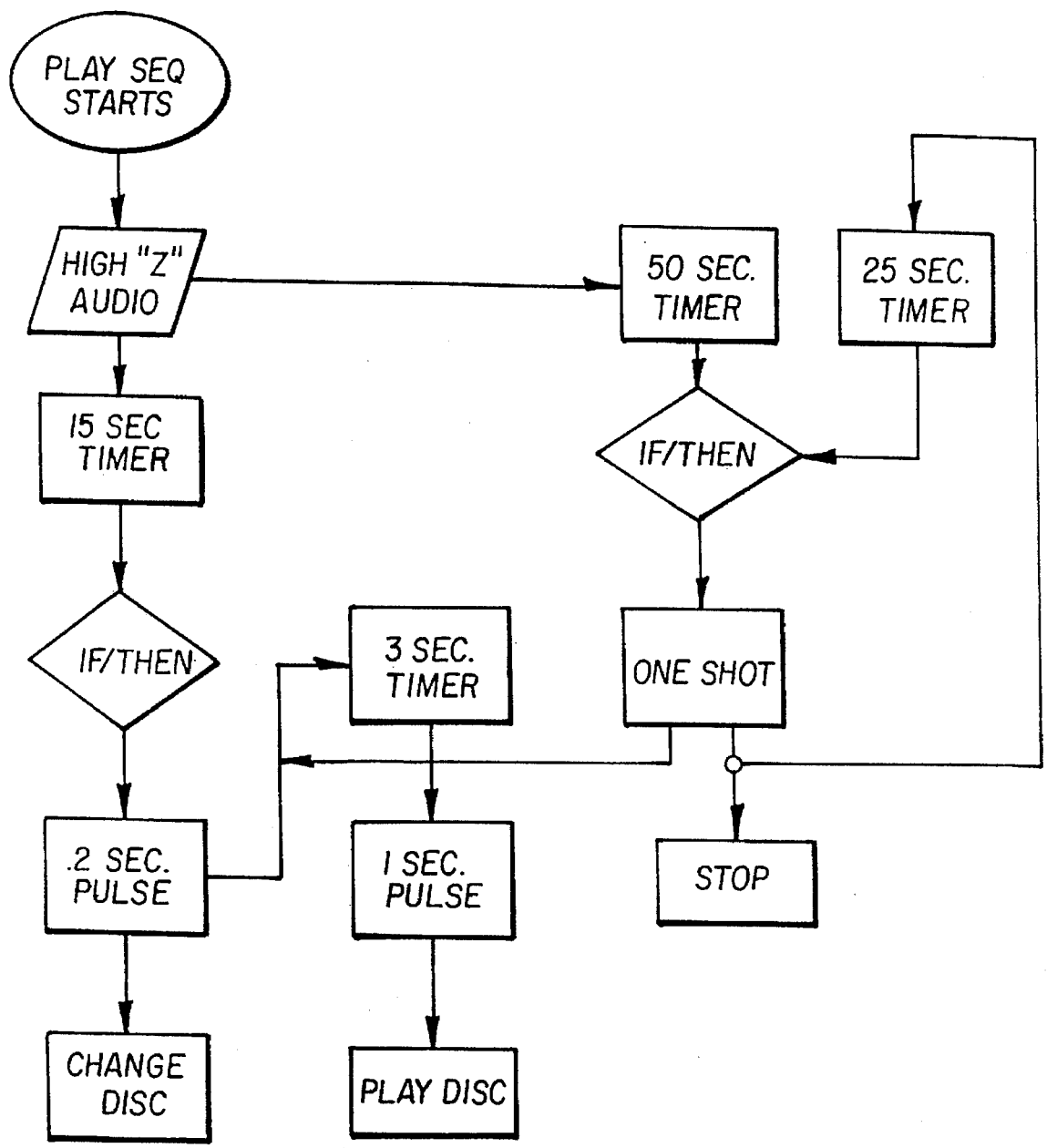
FIG. 6 is a flow diagram illustrating another operational sequence of the present invention.

Referring to FIG. 5 and FIG. 3, it is noted that the operation of the circuit of FIG. 3 is similar to that discussed in connection with FIG. 1 with an enhanced STOP signal generator portion including multivibrator circuits 313, 317 and 321 together with OR gate 315 and AND gate 319. FIG. 5 illustrates the operational sequence of the Photo CD player after a "Power-On" of the player and FIG. 6 shows the operational sequence of the Photo CD player upon a "restart" after the final segment containing audio has been completed. At Power-On, a Photo CD viewer would load a plurality of Photo CD discs, which include audio snippets, into the multi-disc Photo CD player and initiate a "PLAY" sequence for the system. The "High Z" audio detector 301 samples the audio from the first program sequence on the Photo CD disc and provides an audio detection signal "A" which is applied to the one-shot multivibrators 303 and 313. When so triggered, one-shot circuit 303 issues a 15 second high going pulse and one-shot circuit 313 outputs a 50 second positive going pulse. Since the time between program sequences is less than 7 seconds, the fifteen second one-shot timer 303 never finishes its cycle until the last audio segment on the active disc is played. At that time, the fifteen second timer completes its cycle and a 0.2 second positive going "CHANGE DISC" command or signal is generated by one-shot circuit 305.

Another output from the One-Shot circuit 305 is applied to one input of AND gate 307 which provides an output to the input of another One-Shot multivibrator circuit 309. Circuit 309 then generates a 3 second positive-going output pulse which is effective to cause multivibrator 311 to issue a 1 second positive-going pulse at the output of circuit 311. The output signal from circuit 311 may be applied to the Photo CD player to effect a "PLAY" command operable to begin the PLAY sequence for a new Photo CD. Therefore, after POWER-ON, a CHANGE DISK command is issued followed by a PLAY command which is generated approximately 3 seconds later.

If the new program sequence fails to begin before the 50 second one-shot timer 313 finishes its cycle, a "STOP" signal is generated at the output of one-shot circuit 317. The STOP signal is also applied to one input of AND gate 319 which, in turn, generates an output signal which is applied to a one-shot multivibrator circuit 321. Circuit 321 is operable to output a 25 second high-going pulse at its output, which is, in turn, operable to cause circuit 317 to output another STOP signal for application to the Photo CD player.

The second output of the circuit 317 is applied to the AND gate 307 and the output of gate 307 triggers circuits 309 and 311 which, in turn, generate a PLAY signal approximately 4 seconds after the last generation of the STOP signal. The "STOP" signal followed by a "PLAY" signal 4 seconds later, and then by another STOP signal 25 seconds after that, will continue until a program sequence starts and the "High Z" audio detector detects audio content, which, in turn, will initiate the 15 second and 50 second timers. This sequence of events will continue for each portfolio Photo CD with audio snippets until the viewer initiates the "STOP" command or turns off the player power switch.

The apparatus and method of the present invention has been described in connection with the preferred embodiments as disclosed herein. Although several embodiments of the present invention have been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention as defined by the following claims.

| PARTS LIST: | |
|---|---|
| 101 | audio detector circuit |
| 103 | one-shot multivibrator circuit/pulse generator LS123 |
| 105 | one-shot multivibrator circuit/pulse generator LS123 |
| 107 | one-shot multivibrator circuit/pulse generator LS123 |
| 109 | one-shot multivibrator circuit/pulse generator LS123 |
| 111 | one-shot multivibrator circuit/pulse generator LS123 |
| 113 | AND gate |
| 115 | one-shot multivibrator circuit/pulse generator LS123 |
| 117 | one-shot multivibrator circuit/pulse generator LS123 |
| 201 | input |
| 203 | input |
| 205 | resistor |
| 206 | connection point |
| 207 | capacitor |
| 209 | resistor |
| 210 | circuit point |
| 211 | resistor |
| 213 | transistor |
| 215 | resistor |

PARTS LIST:

| | |
|---|---|
| 217 | resistor |
| 218 | circuit point |
| 219 | capacitor |
| 221 | resistor |
| 223 | resistor |
| 225 | transistor |
| 227 | resistor |
| 228 | circuit point |
| 301 | audio detector circuit |
| 303 | one-shot multivibrator circuit/pulse generator LS123 |
| 305 | one-shot multivibrator circuit/pulse generator LS123 |
| 307 | AND gate |
| 309 | one-shot multivibrator circuit/pulse generator LS123 |
| 311 | one-shot multivibrator circuit/pulse generator LS123 |
| 313 | one-shot multivibrator circuit/pulse generator LS123 |
| 315 | OR gate |
| 317 | one-shot multivibrator circuit/pulse generator LS123 |
| 319 | AND gate |
| 321 | one-shot multivibrator circuit/pulse generator LS123 |

What is claimed is:

1. A combination for use with a compact disc (CD) player arranged to receive a plurality of CDs, each of the CDs including both video and audio data, said CD player further including means for reading the CD and providing output signals representative of the video and audio data stored on the CD, the combination comprising:

audio data detecting means connected to the reading means, said audio data detecting means being arranged to provide an audio data signal representative of the presence of audio data on a photo segment of the CD being played;

controller circuit means coupled to said audio data detecting means, said controller circuit means being responsive to said audio data signal to generate a disc change signal after a first predetermined period following the detection of a predetermined characteristic of said audio data signal;

said disc change signal being selectively applied to the CD player to effect a first changing of CDs by the CD player to the next CD of said plurality of CDs;

said controller circuit being further responsive to said audio data signal to generate a first play signal after a second predetermined period following the detection of said predetermined characteristic of said audio data signal, said first play signal being selectively applied to the CD player to effect a playing of said next CD;

said controller circuit being further responsive to said audio data signal to generate a first stop signal after a third predetermined period following the detection of said predetermined characteristic of said audio data signal, said first stop signal being selectively applied to the CD player to effect a termination of play of said next CD.

2. The combination as set forth in claim 1 wherein said controller circuit further includes a restart circuit responsive to the stop signal and the audio data signal, said restart circuit being responsive to an occurrence of a predetermined relationship between said audio data signal and said first stop signal to generate a second play signal, said second play signal being selectively applicable within said CD player to effect a playing of said next CD by the CD player.

3. The combination as set forth in claim 1 wherein said controller circuit includes first, second and third timing circuits coupled to said audio data detecting means, said first, second and third timing circuits being selectively operable to provide said disc change, first play and first stop signals, respectively, said second timing circuit being responsive to a predetermined relationship between said audio data signal and said first stop signal to generate said first play signal.

4. The combination as set forth in claim 3 wherein said third timing circuit includes a restart timing device, said restart timing device being responsive to a predetermined relationship between said stop signal and said audio data signal to effect the generation of a second stop signal after a predetermined restart period following the generation of said first stop signal.

5. A method for controlling the sequential playing of a plurality of photo CDs on a photo CD player, said CDs containing both video and audio data, said method comprising the steps of:

detecting an absence of audio data;

generating a change signal effective to change discs to the next of the plurality of discs whenever said absence of audio data exceeds a first predetermined period;

generating a play signal effective to initiate a play sequence to play said next disc after a second predetermined period following the generation of said change signal; and generating a first stop signal effective to stop the play of said next disc whenever said absence of audio data exceeds a third predetermined period.

6. The method as set forth in claim 5 wherein said method further includes the steps of:

generating a second play signal effective to initiate a play sequence after a predetermined period following said generation of said first stop signal; and generating a second stop signal effective to stop the play of the CD player after a predetermined period following the generation of said second play signal.

* * * * *